Nov. 11, 1930. J. F. CULP 1,781,539
REGULATING VALVE FOR GREASE LUBRICATING SYSTEMS
Filed Jan. 25, 1928
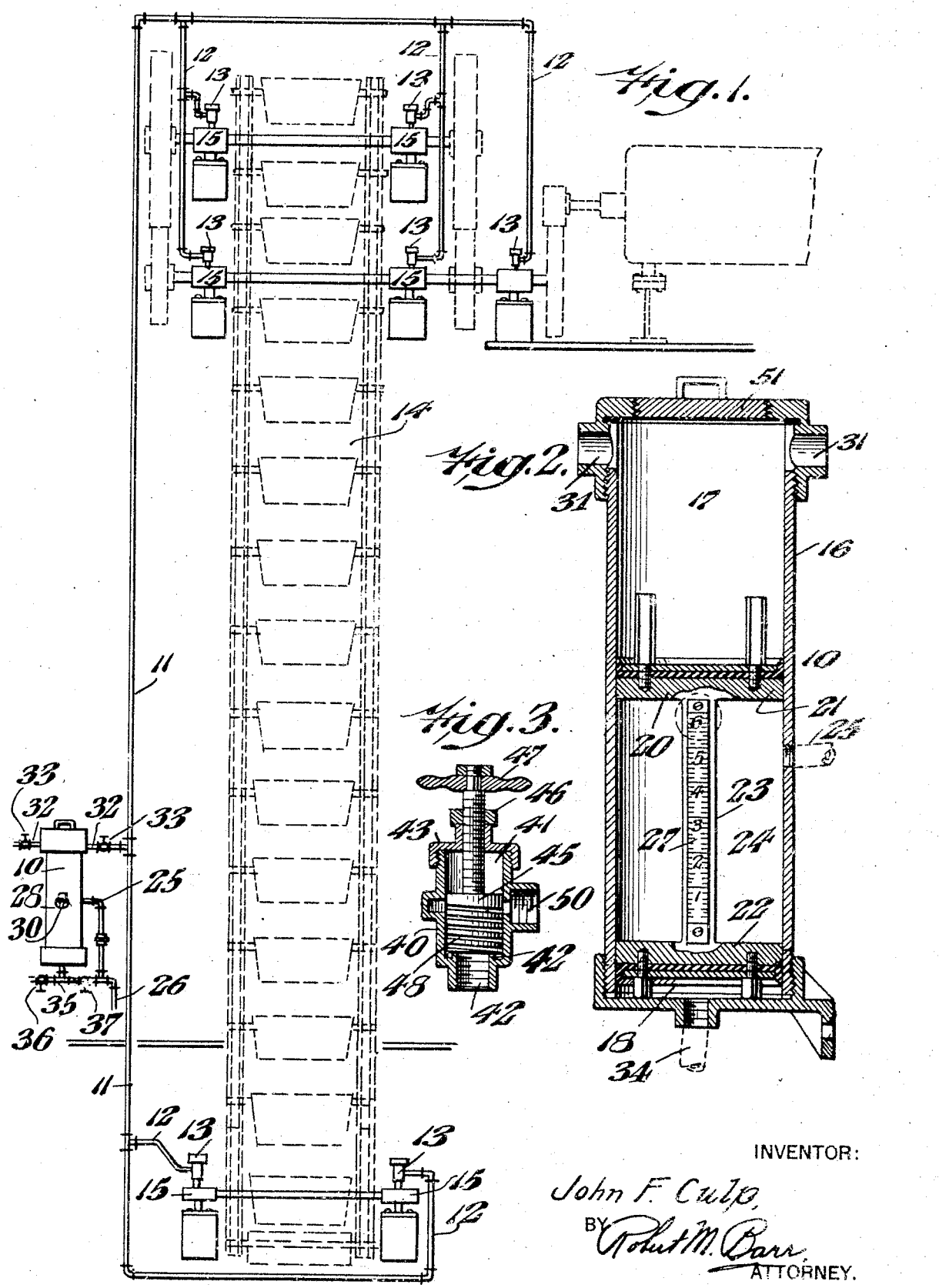
INVENTOR:
John F. Culp,
BY Robert M. Barr,
ATTORNEY.

Patented Nov. 11, 1930

1,781,539

UNITED STATES PATENT OFFICE

JOHN F. CULP, OF PHILADELPHIA, PENNSYLVANIA, ASSIGNOR TO IDEAL LUBRICATOR COMPANY, OF PHILADELPHIA, PENNSYLVANIA, A CORPORATION OF DELAWARE

REGULATING VALVE FOR GREASE LUBRICATING SYSTEMS

Application filed January 25, 1928. Serial No. 249,245.

The present invention relates to central control systems of lubrication and more particularly to a pressure system for supplying a lubricant in the form of grease to a plurality of bearings.

The object of the present invention is to provide an improved control valve for lubricating systems.

In the accompanying drawings, Fig. 1 represents a side elevation of a grease lubricating system with which the valve of the present invention is used; Fig. 2 represents a detail in horizontal section of one form of grease distributor; and Fig. 3 represents an elevation of a regulating valve cut away to show the internal construction thereof.

Referring to the drawings, one form of the device consists generally of a grease distributor 10, a header or manifold 11, supply pipes 12, and a plurality of regulating valves 13 arranged respectively at the grease discharge points upon the bearings to be lubricated. In Fig. 1, the system is illustrated in connection with a vertically disposed bucket conveyor 14 (shown in dotted lines) having a plurality of bearings 15 at different levels.

The grease distributor 10, in the present instance, consists of a cylindrical casing 16, which is divided into a grease chamber 17 and a pressure chamber 18 by a movable plunger element 20. This element 20 consists of two pistons 21 and 22 interconnected axially by a rod 23 whereby an intermediate chamber 24 is provided which communicates with a pipe 25 leading to a drain pipe 26. In order that the position of the element 20 can be determined from the outside of the casing 16, and thus the amount of grease in the chamber 17 be known at all times, the rod 23 carries a gage scale 27 which is visible through a sight opening 28 of transparent material in the side of the casing 16. Preferably a pointer 30 is fixed to the casing 16 in alignment with the opening 28 so that accurate scale readings can be made. Any suitable means may be provided to prevent the piston element from turning in the cylinder in order to maintain the indicating scale properly opposite the sight opening 28.

For discharging grease from the chamber 17, the upper end of the casing 16 is provided with one or more discharge ports 31 connected by pipes 32 to a header or headers and controlled respectively by shut-off valves 33. The lower end of the casing 16 has a pipe 34 communicating with the pressure chamber 18 and also with a supply pipe 35 for steam, water or air under pressure, while a shut-off valve 36 is provided for control purposes as needed. A second shut-off valve 37 is arranged between the pipe 34 and the drain pipe 26, and hence by opening one of the shut-off valves and closing the other the pressure chamber 18 can be connected to either the source of pressure supply or to the drain.

At each of the grease supply outlets to a bearing there is a regulating valve 13, and each of these comprise a valve casing 40 having a through bore 41 terminating at one end in an intake opening 42 and at the other end in a cap 43 which is threaded thereon for easy removal. The intake port is preferably of somewhat reduced diameter and has its inner end provided with a circumferential seat 42 for engagement by the valve closure 45. This closure 45 is of generally cylindrical form, having a snug sliding seat in the bore 41, and is attached to a screw threaded stem 46 which projects through the cap 43 and terminates in a hand-wheel 47 by which its relative position in the casing 40 can be adjusted. That portion of the closure 45 nearest the intake port 42 is provided with a circumferential helical groove 48 which forms a helical passage by which the grease entering through the intake 42 can find its way to the outlet port 50 which is formed in one side of the casing 40. While the ports 42 and 50 have been herein respectively referred to as intake and outlet ports, it will be understood that the path of the grease may as well be in the reverse direction, in which case the outlet 50 becomes the intake and the intake 42 becomes the outlet, and in location such as shown in Fig. 1 this latter arrangement is more conveniently employed. In connection with the bore 41, it should be noted that this is of such a length as to allow the valve closure 45 to be moved a sufficient distance into the closed end of the casing 40 as will provide a maximum flow of grease if desired. Furthermore, by using a closure 45 of cylindrical shape and snugly fitting the bore 41, it will prevent leakage of grease back of the closure, and hence the casing 40 need not be provided with stuffing boxes and other means to prevent leakage along the operating stem.

From the foregoing, it will be seen that the position of the distributor 10 is such that the pressure means for expelling the grease is supplied at the lower end of the distributor and the grease is forced outward from the top to the several points of use, and this makes a very effective and convenient arrangement because access can readily be had to the grease chamber 17 by unscrewing and removing a closure plug 51 in the upper end of the casing 16. In this connection, it should also be noted that this plug is substantially the same diameter as the internal diameter of the casing 16, and when removed leaves a large filling opening which allows the grease to be easily forced into place by a paddle or other implement. When filling, the pressure control shut-off valve 36 is closed and the drain shut-off valve 37 is opened so that the plunger element 20 can be readily pushed down to its lowermost position and the grease chamber can be completely filled. In view of the fact that the plunger element 20 is formed by two interconnected spaced pistons, there is no danger of steam or other pressure medium leaking past the movable element into the chamber containing the grease, and this is a very decided advantage because in systems wherein a single piston is provided such leakage does occur, and in the case of steam results in water of condensation mixing with the grease, in the case of air leads to air binding in the pipes, and in the case of water the same disadvantages as where condensed steam leaks into the grease chamber. In the case of leakage in the present construction, the medium can only find its way past the first piston where it enters a chamber which is in communication with the atmosphere and its pressure is relieved so that it cannot force its way beyond the piston which is in direct contact with the grease. During the discharge of the grease from the distributor, the piston moves upwardly to a point which will finally be reached where any collected water is brought to the level of the discharge outlet and from which it automatically drains as will be understood.

In the operation of the system, the distributor has its chamber 17 filled with grease and its outlet connected to a header or manifold 11 which is arranged to carry the grease into close proximity to all the bearings which are to be lubricated. At the bearing locations, branch pipes are led directly to the bearing and each has its outlet terminating in one of the regulating valves 13. With pressure admitted to the pressure chamber, a continuous uniform pressure is exerted upon the plunger element 20 so that grease is forced through the header 11 and the several supply pipes to the several regulating valves, and each of these is set so that a predetermined amount of grease passes through to the bearing which is to be lubricated. For example, bearings which are at a relatively high level with respect to other bearings have their regulating valves set so that each bearing is properly supplied with lubricant, and similarly bearings at a lower level have their regulating valves set so that the pressure supply of grease will be discharged only in the apportioned amount necessary to maintain the desired film of lubricant about the bearing. The present system employing grease is not open to the objections which are part of such a system using oil or liquid lubricant in that it is impossible to produce siphoning from one part of the pipe line to the other whereby one bearing is allowed to run dry while others are supplied with more oil than necessary, and also there is no danger of pipes becoming air bound as they do when freely flowing oils and liquid lubricants are employed with discharge points at different levels. Furthermore, it will be apparent that the present system will permit the introduction of lubricant to bearings in a predetermined amount so that there is practically no waste through excess supplied, and which system differentiates in structure and function from a system utilizing a liquid oil supply having a return to a central reservoir for use again after purification and reclamation. In the present system, grease alone must be exclusively and of necessity employed for carrying out the desired uniform lubrication of bearings and is known as a grease lubricating system in contra-distinction from systems employing oil and commonly known as closed or circulating lubricating systems.

Having thus described my invention, I claim:

A regulating valve for grease systems comprising a casing provided with an inlet and an outlet arranged substantially at right angles, a closure slidably mounted in said casing and having a portion thereof forming leakproof contact with said casing and another portion having a helical groove disposed between said inlet and said outlet, and means extending through the leakproof protected end of said casing for moving said closure to open and closed position and to change the position of said groove with respect to said inlet.

Signed at Philadelphia, county of Philadelphia, State of Pennsylvania, this 19th day of January, 1928.

JOHN F. CULP.